United States Patent
Voit et al.

[11] Patent Number: 5,865,207
[45] Date of Patent: Feb. 2, 1999

[54] RELEASING MEANS

[75] Inventors: Arno Voit, Hausham; Günter Langel, München, both of Germany

[73] Assignee: Daimler-Benz Aerospace AG, Ottobrunn, Germany

[21] Appl. No.: 734,828

[22] Filed: Oct. 22, 1996

[30] Foreign Application Priority Data

Oct. 30, 1995 [DE] Germany .................. 195 40 378.9

[51] Int. Cl.⁶ ...................................................... F16K 17/16
[52] U.S. Cl. ............................. 137/68.21; 137/68.27; 137/68.28; 137/910; 60/734
[58] Field of Search ............... 137/68.11, 68.19, 137/68.21, 68.23, 68.27, 68.28, 910; 60/734, 257, 258

[56] References Cited

U.S. PATENT DOCUMENTS

| | | | |
|---|---|---|---|
| 2,402,826 | 6/1946 | Lubbock | 137/68.23 X |
| 2,426,808 | 9/1947 | Auer | 137/68.19 X |
| 2,599,593 | 6/1952 | Stroop | 137/68.21 X |
| 3,038,485 | 6/1962 | Hosek | 137/68.27 X |
| 3,039,482 | 6/1962 | Goldberg | 137/68.27 |
| 3,044,479 | 7/1962 | Meyer et al. | 137/68.23 |
| 3,065,950 | 11/1962 | Goldberg | 137/68.19 X |
| 3,472,284 | 10/1969 | Hosek | 137/68.23 X |
| 3,564,845 | 2/1971 | Friedman, Jr. et al. | 137/68.28 X |
| 3,568,448 | 3/1971 | Webb, Jr. | 137/68.28 X |
| 3,714,777 | 2/1973 | Ferris | 60/39.48 |
| 3,842,598 | 10/1974 | Forsten | 60/259 |
| 4,064,003 | 12/1977 | Newton | 137/68.28 X |
| 4,922,708 | 5/1990 | Nelson | 60/734 X |

FOREIGN PATENT DOCUMENTS

| | | |
|---|---|---|
| 29 13 463 B1 | 5/1980 | Germany . |
| 24 27 790 C2 | 2/1983 | Germany . |
| 872892 | 10/1981 | U.S.S.R. ............ 137/68.23 |

*Primary Examiner*—John Rivell
*Attorney, Agent, or Firm*—McGlew and Tuttle

[57] ABSTRACT

A releasing device for rocket fuel lines, arranged between a tank outlet and a shutoff valve, which releases the flow path at a defined, tank-side overpressure, with a piston-like bursting element. A disk is provided with a predetermined breaking point and with a clamping flange, as well as a guide rod that is rigidly attached to the disk, and a catching basket that is permeable to flow and fixes the disk in a positive-locking manner after rupture and axial movement. The bursting element is assembled by welding from two parts, namely, the disk with the clamping flange and the predetermined breaking point as one part, and the guide rod with the disk seat as the other part, the disk with the clamping flange is manufactured by machining from a cold-worked, weldable plate material with low breaking strength, the guide rod is manufactured by machining from the rod stock of which the disk was made or of a weldable material having a higher strength, and the predetermined breaking point is manufactured by machining as a one-sided notch on the side of the bursting element facing away from the tank.

19 Claims, 1 Drawing Sheet

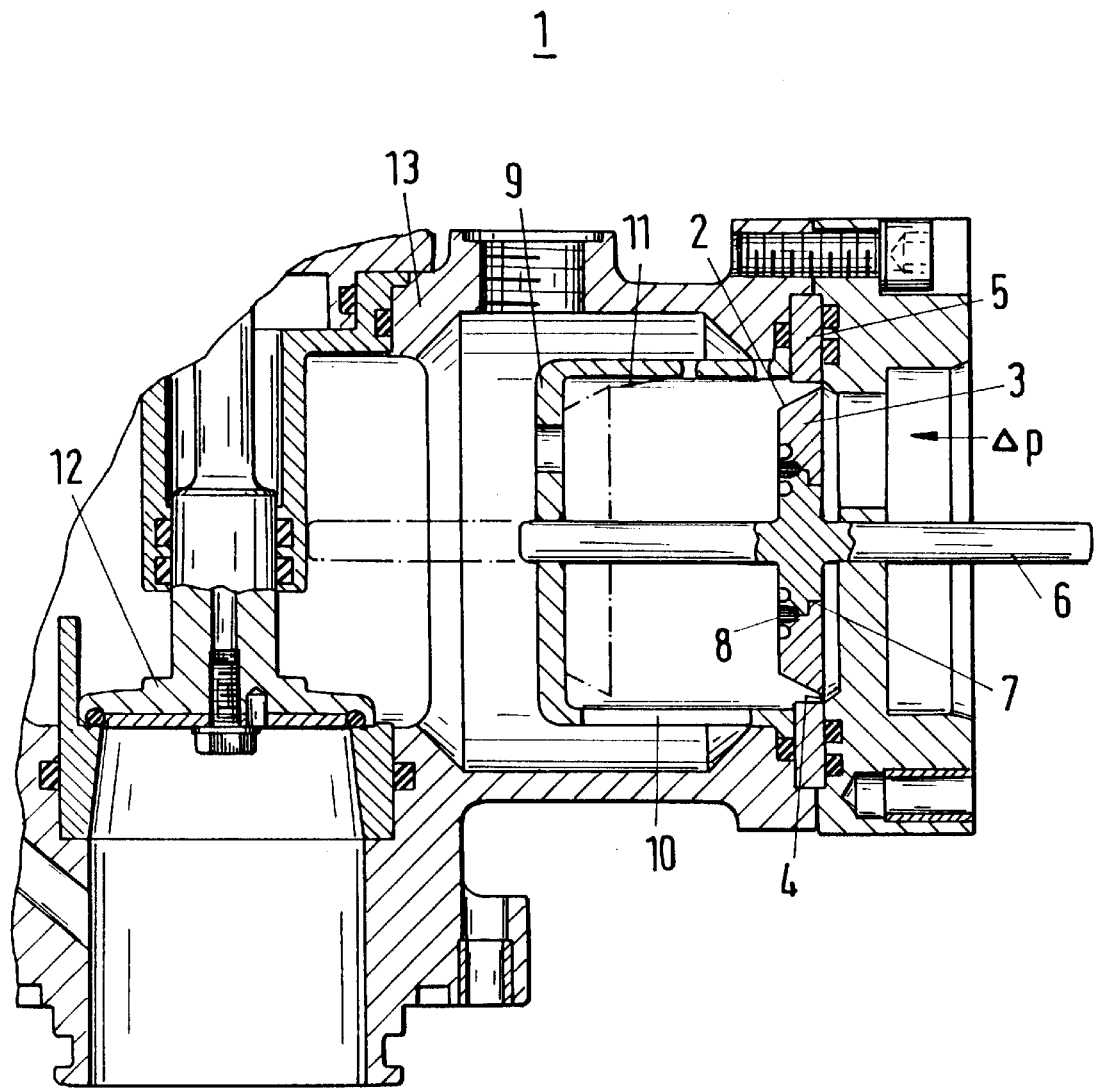

RELEASING MEANS

FIELD OF THE INVENTION

The present invention pertains to a releasing means or releasing device for rocket fuel lines, particularly for hypergolic chemically aggressive rocket fuels, such as MMH (monomethyl hydrazine) and $N_2O_4$ (dinitrogen tetroxide), the release means being disposed in the area between at least one tank outlet and at least one downstream shutoff valve, which releases the flow path by an irreversible rupture of material at a defined, tank side overpressure, with a piston-like bursting element, which comprises a disk, a circumferential predetermined breaking point along the edge of the disk, a central guide rod that is rigidly attached to the disk and a clamping flange surrounding a predetermined breaking point, as well as attaching basket, which fixes the disk in a positive locking manner after rupture and axial displacement and has a low flow resistance, wherein the bursting element is chemically resistant to the particular fuel at least over a rather long period of time.

BACKGROUND OF THE INVENTION

Rocket fuel lines operating according to the bursting principle, which release a flow cross section due to irreversible rupture of material, have been known from a number of publications.

Thus, German Auslegeschrift No. DE-AS 29 13 463 describes a combination of a bursting foil releasing means and a spring-loaded safety valve for securing tanks. etc., against overpressure. The bursting foil arrangement is arranged downstream of the safety valve, and the flow path leads to the atmosphere on the discharge side. The elements are coordinated with one another such that the shearing off of the bursting foil takes place at approximately the same overpressure as the opening of the safety valve against spring force. The bursting foil arrangement in this combination has actually only the task of maintaining the system absolutely tight until the safety valve responds. The fact that the massive rupture disk (called a plate here) clamping the bursting foil is held by a catching device (locking arms) in a positive-locking manner in the shorn-off state after axial displacement can be considered to be an advantageous design feature. A large, defined, low-resistance flow cross section is thus left after a relatively short displacement of the disk.

However, the bursting foil principle described also has drawbacks. As is expressly mentioned in the text, bursting foils tend to form fragments during shearing off. If the flow path formed following the bursting foil leads to further functional elements, such as valves, pumps, nozzles, etc., rather than to the atmosphere, the fragments may lead to serious disturbances and even to system failure. Furthermore, the foils prepared by rolling have relatively great tolerances in terms of their mechanical properties (breaking strength, breaking elongation, etc.), depending on the degree of deformation during manufacture. The incalculable internal stresses generated in the process are also disadvantageous. The clamping of the foil between massive components leads to additional internal stresses, so that the bursting parameters (pressure difference, deformation, etc.) will ultimately have relatively great dispersions. For reasons of tightness, the foils are usually welded to the massive components, as a result of which internal stresses and internal deformations will additionally develop. This makes it clear that a relatively exactly calculable rupture behavior cannot usually be achieved with bursting foils.

Bursting foils usually also have low resistance to aggressive media, and the structural changes and internal stresses resulting from the high degree of deformation have an unfavorable effect. In the case of designs with welded foil, the weld seams, which are correspondingly small, represent areas with especially high risk of corrosion. Finally, it should also be mentioned that the bursting foil arrangement according to the Auslegeschrift in question inherently facilitates the local corrosive attack due to the double-sided notching, which inherently results from the design.

German Patent No. 24 27 790 describes a release valve for pressure tanks, which can be triggered by an explosive force. The element (rupture plate) to be destroyed is separated here in the area of a reduced cross section by igniting a circumferential hollow charge. Since the destruction is brought about here by the explosive force rather than by the inner pressure in the tank, it is possible to use relatively great wall thicknesses, which are unproblematic with respect to corrosion, and the properties of the material of the rupture element also play a less significant role. This is contrasted by the drawbacks that such a solution is absolutely unsuitable in connection with inflammable and explosive media, e.g., rocket fuels, and, in addition, it generates extreme contamination (fragments, remnants of explosive, etc.) in the system.

U.S. Pat. No. 3,842,598 describes a rocket engine for military missiles, which is designed for being able to be stored for a long time and for readiness in a short time. A large part of the volume of the fuel tank is filled with an essentially liquid mixture of a fuel with low oxidant content and an oxidant. It also contains a flexible, sealed tank with additional oxidant. The flexible container is caused to burst in the case of use by means of a pressurized gas (nitrogen) from another tank, and the oxidant released is distributed in the fuel mixture, as a result of which a high-energy, stoichiometric fuel is formed. It is burned in a downstream thrust chamber.

One bursting membrane each is arranged between the pressurized gas tank and the fuel tank as well as between the fuel tank and the thrust chamber for reasons of hermetic sealing during the phase of storage, but no information is given concerning the design of these bursting membranes.

A valve with a bursting element for a rocket fuel system, which is installed in addition to the isolation valve proper, has been known from U.S. Pat. No. 3,714,777. The fuel (here: oxidant) is pressed out of the tank by means of pressurized gas via a tight, flexible membrane or expulsion bladder. If the pressure difference between the pressurized gas and the oxidant is too high, the membrane may be destroyed, and pressurized gas will unintentionally enter the fuel system. The said additional valve regulates the pressure difference to an allowable maximum by automatically throttling the oxidant flow to a variable extent. The bursting element is destroyed by the oxidant pressure at the beginning of the phase of operation, and it releases a pressurized gas line for the control process.

The drawbacks explained at the beginning, such as inaccurate response behavior, disturbances in operation due to fragments, etc., also apply to the designs known from these U.S. patent specifications.

SUMMARY AND OBJECTS OF THE INVENTION

In light of these prior-art solutions and their drawbacks, the object of the present invention is to provide a releasing means operating according to the bursting principle for rocket fuel lines, which keeps the fuel reliably and hermetically away from downstream functional elements prior to its activation, which opens reliably at a relatively accurately predeterminable bursting pressure (pressure difference), which makes it possible to adapt the bursting pressure to different system conditions with a simple design, which causes small, reproducible flow losses with tolerable "water impact effect" with a small installation volume, and which can be manufactured in a relatively simple manner and at low cost.

According to the invention, a releasing device is provided for rocket fuel lines, particularly lines for hypergolic chemically aggressive rocket fuel such as MMH (monomethyl hydrazine) and $N_2O_4$ (dinitrogen tetroxide), in the area between at least one tank outlet and at least one downstream shutoff valve. The releasing means releases the flow path by an irreversible rupture of the material of the defined, tankside over pressure, with a piston-like bursting element. The bursting element comprises a disk with a circumferential predetermined breaking point along the edge of the disk. A central guide rod that is rigidly attached to the disk, and a clamping flange surrounding the predetermined breaking point, as well as a catching basket, which fixes the disk in a positive-locking manner after rupture and axial displacement and which has a low flow resistance, are also provided. The bursting element is chemically resistant to the particular fuel at least over a rather long period of time. The bursting element is assembled from two parts by welding to provide two parts with a weld seam in a material-incorporated manner. The disk and the clamping flange and the predetermined breaking point forms one part and the guide rod and the seat for the disk form the other part. The disk with the clamping flange is manufactured by machining, a cold-worked plate material having a relatively low breaking strength and good weldability. The guide rod and the seat of the disk is manufactured by machining from a cold-worked plate material having a relatively low breaking strength and good weldability. The guide rod and the seat for the disk is manufactured by machining from rods consisting of material used for the disk or a material of higher strength but with good weldability. The predetermined working point is manufactured by machining as a one sided notch on the side of the bursting element facing away from the tank.

The bursting element is assembled from two integral parts by welding, wherein one part (disk with clamping flange and predetermined breaking point) assumes the sealing and bursting function proper, and the other part (guide rod with disk seat) assumes the guiding function during opening after the bursting. The machining of the disk with the clamping flange and the predetermined breaking point from cold-worked plate material makes possible a reproducible, relatively brittle rupture behavior with small breaking elongation despite low breaking strength of the material. The cold-worked material selected has a highly uniform, fine-grained texture with only a slight dispersion of the material characteristics. As a result of this, and as a consequence of the strain-hardening, it ruptures relatively spontaneously under defined loads, uniformly and in a brittle manner without appreciable deformations. The formation of fragments or the formation of particles is most extensively avoided due to a sufficient residual ductility in the bottom of the groove. The predetermined breaking point breaks essentially simultaneously over the entire circumference, so that jamming or bending is practically ruled out. The fine-grained nature and the uniformity of the texture also makes possible a sufficient resistance to corrosion in the area of the smallest material thickness, which is, e.g., only up to a few tenths of one mm. The connecting weld seam is located in the area of great material thickness, is amply dimensioned, and thus represents no problems either in terms of strength or in terms of corrosion.

The machining of the parts to be welded together guarantees sufficient dimensional accuracy and surface finish at a moderate manufacturing cost.

Since the guide rod has no predetermined breaking point, the related requirements mentioned in connection with the disk, such as low breaking elongation, breaking strength, etc., are eliminated. Aside from the dimensional accuracy and good weldability, the guide rod shall not undergo either plastic or excessive elastic deformation during operation in order to avoid difficulties or jamming in the associated guides. It is therefore made of a material whose strength is at least equal, but preferably higher than that of the disk, rods with a slight oversize in diameter being suitable for this purpose as a blank. Sufficient chemical resistance to the actual fuel, which may possibly be improved by surface treatment, should be borne in mind in this connection as well.

The predetermined breaking point is also prepared by machining, and the design as a one-sided notch on the side facing away from the tank simplifies manufacture and also offers a considerably higher resistance to the corrosive attack due to the smoothness of the surface on the side that is exposed to fuel even before the activation.

The disk with the clamping flange preferably is formed of a non-hardenable aluminum magnesium alloy and the guide rod with the seat preferably is formed of the same alloy and preferably a hardenable alloy based on aluminum. The bursting element is preferably coated by yellow chromating on all sides and is thus passivated.

The parts of the bursting element may also be formed of stainless steel. The parts of the bursting element may be designed as turned parts. The notch (the predetermined breaking point) and at least the tank-side surface area of the disk, located opposite are preferably machined to the final size and final surface finish by high-speed turning with a diamond-tipped tool.

The releasing device is preferably integrated with the shut-off valve and arranged upstream of the shut-off valve, provided as one functional unit with a single housing.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

The only FIGURE is a cross-sectional view, partly broken away, showing the releasing device according to the invention.

DESCRIPTION OF THE PREFERRED EMBODIMENTS

The FIGURE shows a releasing means 1, which is integrated into a functional unit in a housing 13 with a shutoff valve 12. The functional unit is part of a rocket fuel line, not shown, and is designed specifically for hypergolic and chemically aggressive fuels. In the embodiment shown, the fuel enters the housing 13 during operation from right to left, is deflected by 90° in the area of the shutoff valve 12, and it finally leaves the housing 13 vertically in the downward direction. A fuel tank, which is activated in the filled state by the admission of pressure, e.g., from an inert gas storage tank, must be imagined upstream of the unit shown. At least one rocket engine, which is supplied with the fuel, is arranged downstream of the unit shown.

The function of the rocket fuel line releasing means 1 is initially to keep the fuel present on the tank side hermetically away from all system elements arranged downstream, including the shutoff valve 12, in order to maintain the entire engine system in a passive state, but in such a way that it is ready for use at any time, and to avoid damage due to corrosion and consequently malfunctions. Thus, the present invention is especially suitable for engine systems which are passive and are able to be stored for rather long periods of time, but shall be able to be rapidly activated. This also makes them interesting for military applications. The further function of the rocket fuel line 1 is to rapidly and reliably release the flow path for the fuel at a defined pressure difference between the tank side and the engine side, which is indicated by "Δp" and an arrow in the FIGURE. No foreign bodies or contamination should possibly enter the fuel in the process, and the flow through the area of the releasing means 1 shall furthermore take place possibly with a low loss.

The "core" of the releasing means 1 is formed by the bursting element 2, which comprises the disk 3 with the predetermined breaking point 4 and the clamping flange 5, as well as the guide rod 6 with the seat 7 for the disk 3. The disk 3 is connected to the guide rod 6 by welding in a material-incorporated manner, so that the former (disk 3) may be made of a cold-worked plate material, and the latter (guide rod 6) may be made of a round stock of equal or higher strength, as a result of which optimal rupture behavior can be combined with good mechanical properties. Weldable light metals, e.g., aluminum-magnesium alloys, are preferred for weight reasons, and all surfaces are machined preferably by turning. The predetermined breaking point 4 is prepared as a one-sided notch on the side of the bursting element 2 that initially faces away from the fuel in order to rule out damage due to corrosion in this critical area. The resistance to corrosion can be markedly increased by yellow chromating on all sides in the case of aluminum alloys. The final treatment of the notch and of the opposite, tank-side end face is advantageously carried out—after preliminary machining by usual turning—by high-speed turning with diamond-tipped tool, as a result of which optimal dimensional and shape accuracy as well as surface finish can be reproducibly obtained. This is important with respect to the fact that the minimum wall thickness in the area of the predetermined breaking point 4 is, e.g., only about one tenth of one mm.

After rupture, the bursting element 2 performs a limited axial lifting movement and is movably mounted for this purpose on both sides in corresponding mounting holes for the guide rod 6. The lifting movement is limited in the active, open position by a catching basket 9, which will then fix the disk 3 in this position in a positive-locking manner by means of one or more retaining springs 11. Unintended axial movements, e.g., those caused by acceleration, and consequently changes in flow are thus avoided. The fixed position is indicated in the FIGURE by dash-dotted lines. The catching basket 9 is provided at least on its circumference with a plurality of openings 10 of a sufficient size, which allow the fuel to flow through unhindered. In addition, the catching basket 9 centers the downstream part of the guide rod 6.

Thus, the releasing means according to the present invention is characterized by a reliable, hermetic sealing behavior, a reliable, reproducible and rapid opening behavior, minimal flow losses, small space requirement, as well as by the avoidance of "water impact effects" and of "contamination" of the fuel. In addition, the releasing means can be adapted to changed operating parameters by varying the geometry as well as the material mainly of the bursting element in a relatively simple manner without problems. Its manufacture as such is also relatively simple and inexpensive.

While specific embodiments of the invention have been shown and described in detail to illustrate the application of the principles of the invention, it will be understood that the invention may be embodied otherwise without departing from such principles.

What is claimed is:

1. A releasing device for rocket fuel lines, including rocket fuel lines for hypergolic, chemically aggressive rocket fuels with one of MMH (monomethyl hydrazine) and $N_2O_4$ (dinitrogen tetroxide), the device being disposed in an area between at least one tank outlet and at least one downstream shutoff valve, the device comprising:

a piston-like bursting element which releases a rocket fuel flow path by an irreversible rupture of material at a defined, tank-side overpressure, said bursting element including
a first part manufactured by machining from a cold-worked plate material having a relatively low breaking strength and good weldability, said first part having a disk, a circumferential predetermined breaking portion along an edge of said disk and a clamping flange surrounding said predetermined breaking portion, said predetermined breaking portion being manufactured by machining as a one-sided notch on the side of the said bursting element facing away from the tank, and
a second part manufactured by machining from rods consisting of one of a material used for said disk and a material of higher strength than said material used for said disk, with good weldability, said second part having a central guide rod and a seat that is rigidly attached to said disk by welding, with a weld seam, in a material-incorporated manner, said bursting element being chemically resistant to a particular fuel at least over a rather long period of time;
a catching basket, which fixes said disk in a positive-locking manner after rupture of said predetermined breaking portion and after axial displacement of said disk, said catching basket having a low flow resistance.

2. A releasing device in accordance with claim 1, wherein said disk with said clamping flange consists of a nonhardenable aluminum-magnesium alloy and said guide rod with said seat consists of the same alloy.

3. A releasing device in accordance with claim 1, wherein said disk with said clamping flange consists of a nonhardenable aluminum-magnesium alloy and said guide rod with said seat consists of a hardenable alloy based on aluminum.

4. A releasing device in accordance with claim 2, wherein said bursting element is coated by yellow chromating on all sides and is thus passivated.

5. A releasing device in accordance with claim 3, wherein said bursting element is coated by yellow chromating on all sides and is thus passivated.

6. A releasing device in accordance with claim 1, wherein each of said first part and said second part of the said bursting element consist of stainless steel.

7. A releasing device in accordance with claim 1 wherein said parts of the said bursting element are designed as turned parts.

8. A releasing device in accordance with claim 7, wherein said notch of said predetermined breaking portion and at least a tank-side surface area of said disk located opposite said predetermined breaking portion are machined to a final size and a final surface finish by high-speed turning with diamond-tipped tool.

9. A releasing device in accordance with claim 1, wherein the device is integrated with a shutoff valve arranged downstream of the device to form one functional unit in a single housing.

10. A releasing device for rocket fuel lines, including rocket fuel lines for hypergolic, chemically aggressive rocket fuels, the device being disposed in an area between at least one tank outlet and at least one downstream shutoff valve, the device comprising:
   a piston-like bursting element which releases a rocket fuel flow path by an irreversible rupture of material at a defined, tank-side overpressure, said bursting element including
      a first part manufactured by machining from a cold-worked plate material having a relatively low breaking strength and good weldability, said first part having a disk, a circumferential predetermined breaking portion along an edge of said disk and a clamping flange surrounding said predetermined breaking portion, said predetermined breaking portion being manufactured by machining as a one-sided notch on the side of the said bursting element facing away from the tank, and
      a second part manufactured by machining from rods consisting of one of a material used for said disk and a material of higher strength than said material used for said disk, with good weldability, said second part having a central guide rod and a seat that is rigidly attached to said disk by welding, with a weld seam, in a material-incorporated manner, said bursting element being chemically resistant to the hypergolic, chemically aggressive rocket fuel;
   a catching basket, which fixes said disk in a positive-locking manner after rupture of said predetermined breaking portion and after axial displacement of said disk, said catching basket having openings for flow therethrough.

11. A releasing device in accordance with claim 10, wherein said disk with said clamping flange consists of a nonhardenable aluminum-magnesium alloy and said guide rod with said seat consists of the same alloy.

12. A releasing device in accordance with claim 10, wherein said disk with said clamping flange consists of a nonhardenable aluminum-magnesium alloy and said guide rod with said seat consists of a hardenable alloy based on aluminum.

13. A releasing device in accordance with claim 11, wherein said bursting element is coated by yellow chromating on all sides and is thus passivated against reacting and corroding.

14. A releasing device in accordance with claim 12, wherein said bursting element is coated by yellow chromating on all sides and is thus passivated against reacting and corroding.

15. A releasing device in accordance with claim 10, wherein each of said first part and said second part of the said bursting element consist of stainless steel.

16. A releasing device in accordance with claim 10 wherein said parts of the said bursting element are designed as turned parts.

17. A releasing device in accordance with claim 16, wherein said notch of said predetermined breaking portion and at least a tank-side surface area of said disk located opposite said predetermined breaking portion are machined to a final size and a final surface finish by high-speed turning with diamond-tipped tool.

18. A releasing device in accordance with claim 10, wherein the device is integrated with a shutoff valve arranged downstream of the device to form one functional unit in a single housing.

19. A releasing device for rocket fuel lines, including rocket fuel lines for hypergolic, chemically aggressive rocket fuels, the device being disposed in an area between at least one tank outlet and at least one downstream shutoff valve, the device comprising:
   a piston-like bursting element which releases a rocket fuel flow path by an irreversible rupture of material at a defined, tank-side overpressure, said bursting element including
      a first single piece integral part manufactured by machining from a cold-worked plate material having a relatively low breaking strength and good weldability, said first part having a disk, a circumferential predetermined breaking portion along an edge of said disk and a clamping flange surrounding said predetermined breaking portion, said predetermined breaking portion being manufactured by machining as a one-sided notch on the side of the said bursting element facing away from the tank, and
      a second single piece integral part manufactured by machining from rods consisting of one of a material used for said disk and a material of higher strength than said material used for said disk, with good weldability, said second part having a central guide rod and a seat that is rigidly attached to said disk by welding, with a weld seam, in a material-incorporated manner, said bursting element being chemically resistant to the hypergolic, chemically aggressive rocket fuel;
   a catching basket, which fixes said disk in a positive-locking manner after rupture of said predetermined breaking portion and after axial displacement of said disk, said catching basket having openings for flow therethrough.

* * * * *